US012658044B2

(12) United States Patent
Münning et al.

(10) Patent No.: US 12,658,044 B2
(45) Date of Patent: Jun. 16, 2026

(54) METHOD FOR SUPPORTING A PARKING PROCESS IN A ROAD SECTION, DRIVER ASSISTANCE DEVICE, AND MOTOR VEHICLE

(71) Applicant: Volkswagen Aktiengesellschaft, Wolfsburg (DE)

(72) Inventors: Daniel Münning, Braunschweig (DE); Lukas Ackert, Frellstedt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 40 days.

(21) Appl. No.: 18/255,144

(22) PCT Filed: Nov. 15, 2021

(86) PCT No.: PCT/EP2021/081721
§ 371 (c)(1),
(2) Date: May 31, 2023

(87) PCT Pub. No.: WO2022/117323
PCT Pub. Date: Jun. 9, 2022

(65) Prior Publication Data
US 2024/0105057 A1 Mar. 28, 2024

(30) Foreign Application Priority Data
Dec. 1, 2020 (DE) ..................... 10 2020 215 092.3

(51) Int. Cl.
*G08G 1/14* (2006.01)
*B60W 30/06* (2006.01)
(Continued)

(52) U.S. Cl.
CPC ............. *G08G 1/143* (2013.01); *B60W 30/06* (2013.01); *B60W 40/105* (2013.01);
(Continued)

(58) Field of Classification Search
CPC ............ G01C 21/3685; G01C 21/3691; G08G 1/0112; G08G 1/0129; G08G 1/147; G08G 1/168
See application file for complete search history.

(56) References Cited

U.S. PATENT DOCUMENTS 10,431,078 B2 * 10/2019 Van Laethem ........ G08G 1/052
2003/0163227 A1 * 8/2003 Yanai ................. G01C 21/3685
701/1
(Continued)

FOREIGN PATENT DOCUMENTS

CN 110415555 A 11/2019 ............... G06K 9/00
DE 102012221036 A1 5/2014 ........... B60W 30/06
(Continued)

OTHER PUBLICATIONS

German Office Action, Application No. 102020215092.3, 4 pages.
(Continued)

*Primary Examiner* — Quan Zhen Wang
*Assistant Examiner* — Mancil Littlejohn, Jr.
(74) *Attorney, Agent, or Firm* — Slayden Grubert Beard PLLC

(57) ABSTRACT

The disclosure relates to a method for supporting a parking process in a road section, wherein respective speeds of reference vehicles in the road section are received by a vehicle-external central computer, a statistical value for the road section is created from the respective speeds by the vehicle-external central computer, a speed of a motor vehicle while driving along the route section is detected by a driver assistance device of the motor vehicle, the detected speed is compared with the statistical value for the road section according to a predetermined comparison method, and a query signal for supporting a parking process is output by the driver assistance device to a driver of the motor vehicle by means of an output apparatus if the detected
(Continued)

speed of the motor vehicle fulfills a predetermined criterion in respect of the statistical value while the motor vehicle is driving along the road section.

10 Claims, 1 Drawing Sheet

(51) Int. Cl.

| | | |
|---|---|---|
| *B60W 40/105* | (2012.01) | |
| *B60W 50/14* | (2020.01) | |
| *G08G 1/01* | (2006.01) | |
| *G08G 1/015* | (2006.01) | |
| *G08G 1/052* | (2006.01) | |
| *G08G 1/0967* | (2006.01) | |

(52) U.S. Cl.

CPC ........... *B60W 50/14* (2013.01); *G08G 1/0125* (2013.01); *G08G 1/0141* (2013.01); *G08G 1/015* (2013.01); *G08G 1/052* (2013.01); *G08G 1/096725* (2013.01); *G08G 1/096775* (2013.01); *B60W 2050/146* (2013.01); *B60W 2556/45* (2020.02)

(56) References Cited

U.S. PATENT DOCUMENTS

| | | | |
|---|---|---|---|
| 2014/0088836 A1* | 3/2014 | Staack ..................... | G05D 3/00 |
| | | | 701/49 |
| 2017/0355307 A1 | 12/2017 | Ha et al. | |
| 2018/0286236 A1* | 10/2018 | Mazzola .......... | G08G 1/096838 |

FOREIGN PATENT DOCUMENTS

| | | | | |
|---|---|---|---|---|
| DE | 102017007823 A1 | 4/2018 | .............. | G08G 1/14 |
| DE | 102019205083 A1 | 10/2020 | ........... | B06W 30/06 |
| DE | 102020215092 B3 | 2/2022 | ........... | B60W 30/06 |
| JP | 2013154730 A | 8/2013 | .............. | B60R 1/00 |
| WO | 2022/117323 A1 | 6/2022 | ........... | B62D 15/02 |

OTHER PUBLICATIONS

International Search Report and Written Opinion, Application No. PCT/EP2021/081721, 10 pages.

Chinese Office Action, Application No. 202180079398.0, 12 pages, May 30, 2025.

* cited by examiner

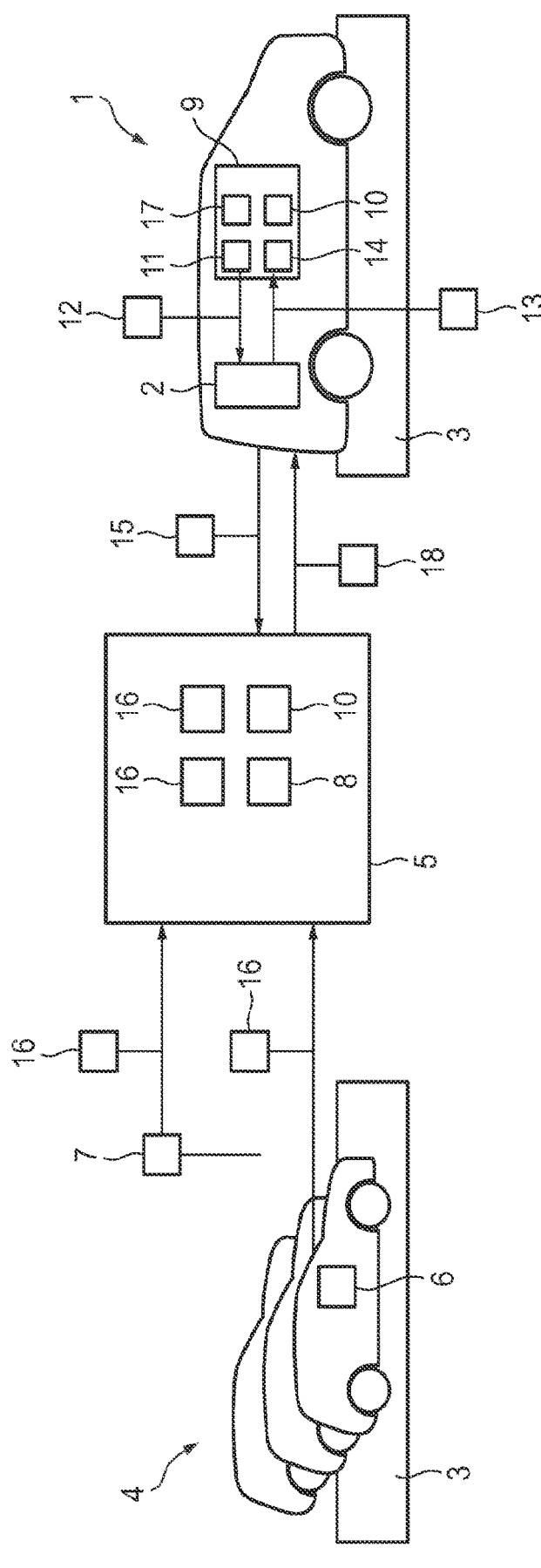

METHOD FOR SUPPORTING A PARKING PROCESS IN A ROAD SECTION, DRIVER ASSISTANCE DEVICE, AND MOTOR VEHICLE

CROSS-REFERENCE TO RELATED APPLICATIONS

This application claims priority to German Patent Application No. DE 10 2020 215 092.3, filed on Dec. 1, 2020 with the German Patent and Trademark Office. The contents of the aforesaid patent application are incorporated herein for all purposes.

TECHNICAL FIELD

The invention relates to a method and a driver assistance device for supporting a parking process in a road section and to a motor vehicle comprising the driver assistance device for supporting a parking process in a road section.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

To support a driver when performing a parking process, it is common to provide driver assistance devices in vehicles. These can support the driver when performing the parking process by means of instructions, displaying distances to adjacent objects, or interventions in the guidance of the vehicle. To enable the parking process to be initiated with minimal involvement by the driver, it is provided in some driver assistance devices that it is presumed based on predetermined indicators that the driver wishes to park. A possible indicator may be, for example, engaging a reverse gear when the vehicle is stationary. As a next step, the drive simply has to confirm the wish to park.

In order to be able to detect a wish to park when a vehicle is driving, it is typical to use the driving speed of the vehicle as an indicator. This is attributed to the fact that a driver who intends to initiate a parking process, shown by experience, reduces speed in order, for example, to be able to search a row of parking spaces for a parking opportunity or to shorten the necessary braking process before initiating the parking process. In this method, the current driving speed of the vehicle is compared with a specified threshold value. If this threshold value is undershot, the driver assistance device presumes that the driver wishes to park and offers support for performing the parking process.

A disadvantage when choosing a specified threshold value for the speed as an indicator that a wish to park exists is the fact that reducing the driving speed does not necessarily mean that the driver wishes to park. The reduced driving speed can, for example, be due to increased traffic, poor road and/or weather conditions, or unclear traffic routing. A comparison of the current driving speed with a threshold value that depends on a prescribed speed limit for a road section is often not a satisfactory solution, because the road section can be, for example, in a poor state, which leads to vehicles having an average speed that, despite a higher allowed speed, is considerably below the allowed speed. Setting a global threshold value for a road without individually adapting the value to individual road sections of the road can lead in this case to a wish to park being erroneously detected when a vehicle drives along this road section. Frequent erroneous detections can lead to reduced acceptance of the function by the driver. He may then deactivate the corresponding automatic function. It is therefore necessary for driver assistance systems to reliably detect that a driver wishes to park.

SUMMARY

A need exists to provide a method that enables a more reliable detection of a wish to park of a driver of a motor vehicle.

The need is addressed by a method for supporting a parking process in a road section. Embodiments are described in the dependent claims, the following description, and the drawings.

BRIEF DESCRIPTION OF THE DRAWINGS

The FIGURE shows an example method for supporting a parking process in a road section.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the method according to some embodiments, it is provided that respective speeds of reference vehicles in the road section are received by a vehicle-external central computer. In other words, it is provided that the vehicle-external central computer receives the speeds at which vehicles are driven when they drive along the road section. The vehicles are thus used as reference vehicles because their speed is used as a reference for the further method. The speeds can, for example, be sent to the vehicle-external central computer by the respective reference vehicles or be detected by an infrastructure apparatus and sent to the vehicle-external central computer. A statistical value for the road section is created from the respective speeds by the vehicle-external central computer. In other words, the speeds driven in the road section are evaluated by the vehicle-external central computer and the statistical value is determined based on the speeds. The statistical value can be, for example, a distribution or an average value of the speeds.

A speed of a motor vehicle while driving along the route section is detected by a driver assistance device of the motor vehicle. In other words, the current speed of the motor vehicle at which the motor vehicle is driving along the route section is ascertained by the driver assistance device. The detected speed is compared with the statistical value for the road section according to a predetermined comparison method. In other words, the speed at which the motor vehicle drives along the route section is compared with the speeds, described by the statistical value, at which the reference vehicles on this road section were previously driving and/or are currently driving. This comparison is made according to the predetermined comparison method.

A query signal for supporting a parking process is output by the driver assistance device to a driver of the motor vehicle by an output apparatus if the detected speed of the motor vehicle fulfills a predetermined criterion in respect of the statistical value while the motor vehicle is driving along the road section. In other words, the query signal is output to the driver by the output apparatus of the driver assistance device if the predetermined criterion is fulfilled by the detected speed of the motor vehicle. The output apparatus can comprise, for example, a screen, a speaker, or a haptic element. The query signal can be, for example, an optical, acoustic, or haptic signal that is aimed at the driver. With the query signal, the driver can be prompted to confirm or reject an initiation of support of the parking process. The predetermined criterion in respect to the statistical value can comprise, for example, a specific value range of a statistical distribution, a relationship in relation to an average, or a threshold. The present embodiments have the benefit that a potential wish to park can be detected taking into account the speeds typically driven in the road section.

Some embodiments provide that the statistical value is an average value of the speed. In other words, it is provided that the detected speed of the motor vehicle while driving along the road section is compared in the predetermined comparison method with the average speed at which the reference vehicles drive along the road section. Therefore, a benefit exists that, with the average value, a simple statistical value for the comparison method can be provided.

Some embodiments provide that the statistical value is a distribution of the speed. In other words, it is provided that the speeds of the reference vehicles along this route section is described by a distribution or a distribution function as the statistical value. Using a speed distribution results in the benefit that a more differentiated comparison method is enabled in order to detect a wish to park. It can be provided, for example, that characteristic patterns occur in the speed distribution that enable a selection of one or more value ranges of the speed as a criterion for a wish to park.

Some embodiments provide that the statistical value is dependent on the time of year and/or is dependent on the day of the week and/or is dependent on the time of day. In other words, the statistical value is dependent on a time of day, a day of the week, and/or a time of year in which the speeds of the reference vehicles were detected. The embodiments have the benefit that it can be taken into account in the statistical value that the speeds driven in a road section can vary depending on a time of day, a day of the week, and/or a time of year. It can thus, for example, be considered that lower average speeds are driven on the route section during, for example, a commuting time than at other times of day due to increased traffic levels. The dependency on the day of the week can take into account in particular a difference in speeds between work days and holidays. A dependency on the time of year can take into account, for example, that a lower speed is driven on the route section in the fall or in the winter due to poorer road conditions. Therefore, a benefit exists that the statistical value can be temporally graded.

Some embodiments provide that the statistical value is dependent on the type of vehicle. In other words, it is provided that the statistical value has a dependency on a type of vehicle. The type of vehicle can comprise, for example, a passenger car, a truck, an emergency vehicle, or a motorcycle. The speeds driven on the route section can thus be associated with the respective type of vehicle. In other words, the statistical value indicates which speed was driven by which type of vehicle on the route section. This results in the benefit that differences in the speed between individual types of vehicles can be taken into account. It may occur that different average speeds are driven in the road section, for example, due to legal regulations that can prescribe different driving speeds for different types of vehicles in a road section. Another cause of different driving speeds can be attributed to an incline or a slope in the road section, which leads to, for example, trucks driving at lower speeds in the road section than passenger cars. Taking into account speeds of the trucks in the road section when detecting a wish to park of a driver of a passenger car could reduce the reliability of the detection in this case.

Some embodiments provide that the predetermined criterion is dependent on a distance of the motor vehicle from a geographic destination. In other words, it can be provided that the driver of the motor vehicle is guided by a navigation system to reach a specified geographic destination. Since it can be assumed that the driver intends to park the motor vehicle in the vicinity of the geographic destination, the predetermined criterion can be adapted such that a threshold value for detecting a wish to park is lowered, for example, in the vicinity in a predetermined radius within the geographic destination in order to lower the hurdle for initiating the parking process. This results in the benefit that it can be taken into account that the motor vehicle should be parked in the vicinity of the destination.

Some embodiments provide that the fulfillment of the predetermined criterion in respect to the statistical value by the detected speed of the motor vehicle while driving along the road section is detected by the central computer, and the driver assistance device is instructed by means of a notification signal to output the query signal.

Some embodiments provide that a partially or fully autonomous parking process is initiated by the driver assistance device if a predetermined user input is detected by an input apparatus of the driver assistance device after the query signal is output. In other words, it is provided that the motor vehicle is parked partially or fully autonomously by the driver assistance device if the driver makes a predetermined user input as a response to the output query signal. The user input can be, for example, actuating a button or lever of a touchscreen or a spoken user input. The input apparatus can be, for example, a screen, a button, a lever, or a microphone. This results in the benefit that the driver is given the opportunity to initiate a partially or fully autonomous parking process when it is detected that the driver wishes to park.

Some embodiments also provide a driver assistance device for a motor vehicle. The driver assistance device can comprise in particular a microcomputer and/or a microcontroller. The driver assistance device is configured to detect a speed of the motor vehicle while driving along a route section. The driver assistance device is configured to compare the detected speed with a statistical value for the road section according to a predetermined comparison method. The driver assistance device is configured to output a query signal for supporting a parking process to a driver of the vehicle by means of an output apparatus if the detected speed of the motor vehicle fulfills a predetermined criterion in respect of the statistical value while the motor vehicle is driving along the road section.

Some embodiments also provide a motor vehicle with a driver assistance device. The motor vehicle may be, for example, a passenger car or a truck. The driver assistance device is configured to detect a speed of the motor vehicle while driving along a route section. The driver assistance device is configured to compare the detected speed with a statistical value for the road section according to a predetermined comparison method. The driver assistance device is configured to output a query signal for supporting a parking process to a driver of the vehicle by means of an output apparatus if the detected speed of the motor vehicle fulfills a predetermined criterion in respect of the statistical value while the motor vehicle is driving along the road section.

Also belonging to the present disclosure are embodiments of the driver assistance device and the motor vehicle that have features which have already been described in conjunction with the discussed embodiments of the method. For this reason, the corresponding embodiments of the driver assistance device according and of the motor vehicle are not described again.

The teachings herein also include combinations of the features of the described embodiments.

In the following, further exemplary embodiments are described. For this purpose, the single FIG. shows a possible procedure of a method for supporting a parking process in a road section.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

The single FIG. shows a possible procedure of a method for supporting a parking process in a road section 3. The motor vehicle 1 may be, for example, a truck or a passenger car. The motor vehicle 1 may be guided, for example, manually, partially autonomously, or fully autonomously. For this, the method can be provided to support a driver 2 of the motor vehicle 1 when performing a parking process. For this purpose, it may be necessary to detect the driver's 2 wish to park the motor vehicle 1. The driver 2 can guide the motor vehicle 1 along a road section 3. An indicator for the detection of a wish to park is the speed 15 at which the motor vehicle 1 drives along the road section 3. Drivers 2 who intend to park a motor vehicle 1 generally tend to drive more slowly than other traffic participants on the road section 3 so that they can determine a possible free parking space along the road section 3. The difficulty in detecting a wish to park using a current speed 15 of a motor vehicle 1 is the fact that a speed 15 when driving along a road section 3 is influenced by many factors. Driving slowly does not necessarily need to be attributed to a wish to park. The speed 15 can be attributed, for example, to unclear roads, unfavorable weather, or a high traffic volume. This means that a legally allowed speed 15 for the road section 3 is not a suitable reference value. In order to ascertain a suitable reference value for the speed 15, it is provided in the method that respective speeds 16 of reference vehicles 4 driving along the road section 3 are detected and transmitted to a vehicle-external central computer 5. Detecting the speeds 16 and sending them to the central computer 5 can be done by detection apparatuses 6 of the reference vehicles 4 or by infrastructure apparatuses 7, wherein these can be cameras or radar systems for monitoring the traffic. Detecting the speeds 16 on the road section 3 can be done in particular over a longer period of time, so that a sufficient scope of detected speeds 16 is provided in the external central computer 5. In addition to the driving speeds 15 transmitted in each case, a type of vehicle of each of the reference vehicles 4, for example, can also be transmitted to the central computer 5. The type of vehicle can be, for example, a passenger car, a truck, an emergency vehicle, or a construction vehicle. As a result, a more precise differentiation of the driven speeds 16 according to types of vehicles can be made. The speeds 16 can also each comprise a period of time in which the speed 15 was driven. As a result, it may be possible to list the driven speeds 16 depending on a time of day, a day of the week, or a time of year. A statistical value 8 for the road section 3 can be created from the received speeds 16 by the central computer 5. This can be, for example, an average value, a median value, a distribution function, or a distribution. The speed 15 along the road section 3 can thus be described by the statistical value 8. The statistical value 8 can be used as a reference for detecting the wish to park based on the current speed 15 of the motor vehicle 1. The motor vehicle 1 that should be checked for the presence of a wish to park can also detect its speed 15 when driving on the road section 3.

In order to be able to determine a wish to park, it can be provided that a wish to park is assumed if a predetermined criterion 10 in respect of the statistical value 8 is fulfilled by the speed 15 of the motor vehicle 1. The predetermined criterion 10 can be specified at the factory or be chosen by the driver 2 of the motor vehicle 1. To ascertain whether the predetermined criterion 10 is fulfilled, a predetermined comparison method can be provided in which the speed 15 of the motor vehicle 1 is compared with the statistical value 8 and/or evaluated. It can be provided that the comparison method is performed by the central computer 5. In this case, the speed 15 of the motor vehicle 1 can be transferred to the central computer 5 by the driver assistance device 9 of the motor vehicle 1. The central computer can compare the speed 15 with the statistical value 8 according to the predetermined comparison method in order to check whether the predetermined criterion 10 is fulfilled in respect of the statistical value 8. The predetermined criterion 10 can comprise, for example, an undershooting of an average speed 15 by an absolute value or a relative value. It can also be possible that the predetermined criterion 10 comprises a specific value range in a speed distribution. The statistical value 8 and/or the predetermined criterion 10 can also depend on the time of day, the day of the week, the time of year, or the type of the motor vehicle 1. Other factors can comprise, for example, weather in order to take into account that reference vehicles 4 generally drive more slowly in the rain than in conditions with good visibility. The criterion 10 can also be adapted to the driver 2. This can take into account that drivers 2 with a defensive driving style generally drive more slowly than the average driver 2 and also reduce their speed 15 more in conditions with poor visibility than average drivers 2. As a result, the individual driving style of the driver 2 can be addressed. If the criterion 10 in respect to the statistical value 8 is fulfilled, it can be provided that the central computer 5 sends a notification signal to the driver assistance device 9 of the motor vehicle 1 in order to inform the driver assistance device 9 that the predetermined criterion 10 has been fulfilled. It can also be provided that the fulfillment of the criterion 10 is checked by the driver assistance device 9. In this case, it can be provided that the statistical value 8 is provided in the driver assistance device 9. It can be provided, for example, that the statistical value 8 is transferred to the driver assistance device 9 by the central computer 5 if it is detected based on a current geographic position of the motor vehicle 1, which can be transferred to the central computer 5 by the motor vehicle 1, that the motor vehicle 1 is driving along the road section 3 or is located in the vicinity of the road section 3. It can be provided that a query signal 12 is output to the driver 2 by the driver assistance device 9 by means of an output apparatus 11 if the predetermined criterion 10 is fulfilled. This can be, for example, an acoustic signal that is output by a speaker, a display on a display element, or a vibration of a steering wheel. The query signal 12 can communicate to the driver 2 that a wish to park is presumed. The driver 2 can thus be given the opportunity to confirm or deny the wish to park. It can be provided that the driver 2 can confirm or deny the wish to park by means of a predetermined user input 13 in an input apparatus 14 of the driver assistance device 9. This can be done, for example, through an acoustic signal to a microphone as the input apparatus 14, actuating a button of a touchscreen as the input apparatus 14. The driver assistance device 9 can be configured to initiate a fully or partially autonomous parking process of the motor vehicle 1 or to navigate the driver 2 to a nearby parking space by means of driving instructions when the predetermined user input 13 is detected by the input apparatus 14. When a wish to park is detected during the predetermined comparison method, the current position of the motor vehicle 1 in relation to a geographic destination 17 input into a navigation system can also be taken into account. Here, it can be assumed that a wish to park is more likely when the motor vehicle 1 is located in the vicinity of the geographic destination 17. It can be provided that the threshold for detecting a wish to park is reduced lower depending on a distance from the geographic destination 17. This has the benefit that, due to the use of statistical methods in relation to speeds 16 on a road section 3, a reliable detection of a parking wish is enabled.

If the reference vehicle 4 is driving, for example, more slowly than the average swarm speed 15 (e.g., more slowly than a freely applicable threshold), it can be assumed that the driver 2 is looking for a parking space. In this case, the customer can be shown in a pop-up window that a wish to park has been detected. If the driver 2 confirms the initiation of a parking process, the parking process is started. The present embodiments enable a comparison of the current speed 15 of the motor vehicle 1 with the average speed 15 of a swarm of reference vehicles 4. If, for example, there is no car driving in front but the driver is driving considerably slower than the average swarm driver 2, the assumption can be made that the customer would like to park. With active routing, the threshold for assuming that the vehicle should be parked can be adapted in the vicinity of the destination 17.

LIST OF REFERENCE NUMERALS

1 Motor vehicle
2 Driver
3 Road section
4 Reference vehicle
5 Central computer
6 Detection apparatus
7 Infrastructure apparatus
8 Statistical value
9 Driver assistance device
10 Criterion
11 Output apparatus
12 Query signal
13 User input
14 Input apparatus
15 Speed
16 Speeds
17 Destination
18 Notification signal The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for supporting a parking process in a road section, comprising:
   receiving speeds of a plurality of reference vehicles of a vehicle swarm in the road section by a vehicle-external central computer;
   determining a statistical value for the road section from at least the speeds of the plurality of reference vehicles of the vehicle swarm by the vehicle-external central computer, the statistical value being representative of a characteristic pattern of normal road use of the road section other than parking, the statistical value comprising an average or median value, or a distribution of the speeds of the reference vehicles, depending on the type of vehicle, weather, day of the week, and on time of day;
   detecting, by a driver assistance system of the motor vehicle, a speed of a motor vehicle while driving along the route section;
   detecting, by the driver assistance system of the motor vehicle, the presence of a further vehicle in front;
   comparing the detected speed with the statistical value for the road section according to a predetermined comparison method for evaluating an intention to park the motor vehicle;
   evaluating the intention to park by determining, whether the detected speed of the motor vehicle fulfills a predetermined parking criterion with respect to the statistical value while the motor vehicle is driving along the road section, the determination comprising detecting a relatively lower speed of the motor vehicle compared with the statistical value, the determination further comprising whether the further vehicle in front is present or not;
   if the detected speed of the motor vehicle fulfills the predetermined criterion, selectively outputting a query signal inside the motor vehicle to allow an occupant to initiate a parking process by the driver assistance system; and selectively initiating a partially or fully autonomous parking process by the driver assistance system if a predetermined input by the occupant is detected in response to the query signal.

2. The method of claim 1, wherein the statistical value is a distribution of the speed.

3. The method of claim 2, wherein the statistical value is dependent on the time of year.

4. The method of claim 2, wherein the predetermined criterion is dependent on a distance of the motor vehicle from a geographic destination.

5. The method of claim 1, wherein the statistical value is dependent on the time of year.

6. The method of claim 5, wherein the predetermined criterion is dependent on a distance of the motor vehicle from a geographic destination.

7. The method of claim 1, wherein the predetermined criterion is dependent on a distance of the motor vehicle from a geographic destination.

8. The method of claim 1, wherein the fulfillment of the predetermined criterion in respect to the statistical value by the detected speed of the motor vehicle while driving along the road section is detected by the central computer and the driver assistance system is instructed by a notification signal to output the query signal.

9. A driver assistance system for a motor vehicle, wherein the driver assistance system is configured to:

detect a speed of the motor vehicle while driving along a road section;

compare the detected speed with a statistical value for the road section according to a predetermined comparison method for evaluating an intention to park the motor vehicle, the statistical value being obtained from at least speeds of a plurality of reference vehicles of a vehicle swarm and the statistical value being representative of a characteristic pattern of normal road use of the road section other than parking the statistical value comprising an average or median value, or a distribution of the speeds of the reference vehicles, depending on the type of vehicle, weather, day of the week, and on time of day;

detect, by the driver assistance system of the motor vehicle, the presence of a further vehicle in front;

evaluate the intention to park by determining, whether the detected speed of the motor vehicle fulfills a predetermined criterion with respect to the statistical value while the motor vehicle is driving along the road section, the determination comprising detecting a relatively lower speed of the motor vehicle compared with the statistical value, the determination further comprising whether the further vehicle in front is present or not;

if the detected speed of the motor vehicle fulfills the predetermined criterion, selectively output a query signal inside the motor vehicle to allow an occupant to initiate a parking process by the driver assistance system; and to selectively initiate a partially or fully autonomous parking process if a predetermined input by the occupant is detected in response to the query signal.

10. A motor vehicle comprising a driver assistance system according to claim 9.

* * * * *